(12) United States Patent
Wang et al.

(10) Patent No.: US 9,956,626 B2
(45) Date of Patent: May 1, 2018

(54) DUSTLESS TABLE SAW

(71) Applicants: Zhiming Wang, Missouri City, TX (US); Lisheng Yu, Stafford, TX (US)

(72) Inventors: Zhiming Wang, Missouri City, TX (US); Lisheng Yu, Stafford, TX (US)

(73) Assignee: Siruceo Dustless LLC, Stafford, TX (US)

( * ) Notice: Subject to any disclaimer, the term of this patent is extended or adjusted under 35 U.S.C. 154(b) by 126 days.

(21) Appl. No.: 15/062,089

(22) Filed: Mar. 5, 2016

(65) Prior Publication Data

US 2017/0252841 A1     Sep. 7, 2017

(51) Int. Cl.
| | |
|---|---|
| *B23D 59/00* | (2006.01) |
| *B27G 19/02* | (2006.01) |
| B23D 45/06 | (2006.01) |
| B23D 47/12 | (2006.01) |
| B27B 5/32 | (2006.01) |

(52) U.S. Cl.
CPC ............ *B23D 59/006* (2013.01); *B27G 19/02* (2013.01); *B23D 45/068* (2013.01); *B23D 47/126* (2013.01); *B27B 5/32* (2013.01)

(58) Field of Classification Search
CPC .............................. B23D 59/006; B27G 19/02
See application file for complete search history.

(56) References Cited

U.S. PATENT DOCUMENTS

| | | | | |
|---|---|---|---|---|
| 1,947,662 A | * | 2/1934 | Robinson ................ | B24D 5/16 451/342 |
| 1,986,726 A | * | 1/1935 | Grozier ................... | B08B 15/04 29/DIG. 61 |
| 2,810,408 A | * | 10/1957 | Boice ...................... | B27B 5/243 30/376 |
| 3,119,602 A | * | 1/1964 | Johnson ............... | B23D 59/006 125/13.01 |
| 3,249,134 A | * | 5/1966 | Vogl ...................... | B27G 19/02 144/251.1 |
| 3,669,163 A | * | 6/1972 | Crane ................... | B23D 59/006 30/380 |
| 3,808,922 A | * | 5/1974 | Ohlhoff ................. | B23D 59/02 83/168 |
| 4,063,478 A | * | 12/1977 | Stuy ..................... | B23D 59/006 144/252.1 |
| 4,241,505 A | * | 12/1980 | Bodycomb, Jr. .... | B23D 59/006 144/252.1 |
| 4,243,011 A | * | 1/1981 | Bodycomb, Jr. ...... | B23D 45/12 125/13.01 |
| 4,403,534 A | * | 9/1983 | Altendorf ............ | B23D 59/006 144/252.1 |
| 4,484,417 A | * | 11/1984 | Klingerman .......... | B23D 59/02 125/13.01 |

(Continued)

*Primary Examiner* — Sean Michalski
(74) *Attorney, Agent, or Firm* — Tim Liu; Liu Law Group, pllc

(57) ABSTRACT

A dustless table saw with a built-in dust collection system is disclosed. The table saw uses a soft foldable seal to seal the gap between the blade slot and the blade housing, the blade housing has an internal extraction channel to maximize the dust collection. Another variation of the table saw utilizes a U-shaped blade housing with a divider. The table saw has a built-in raising/lowering mechanism to raise/lower the blade, and a built-in tilting mechanism to tile the blade. The table saw also utilizes an anti-dust blade guard to optimize the dust extraction.

26 Claims, 12 Drawing Sheets

(56) References Cited

U.S. PATENT DOCUMENTS

| | | | | |
|---|---|---|---|---|
| 4,721,023 A * | 1/1988 | Bartlett | B23Q 11/0046 | 83/100 |
| 5,012,583 A * | 5/1991 | Blochle | B23D 49/167 | 30/124 |
| 5,123,317 A * | 6/1992 | Barnes, Jr. | B23D 47/025 | 83/477.1 |
| 5,303,688 A * | 4/1994 | Chiuminatta | B23D 61/025 | 125/15 |
| 5,477,844 A * | 12/1995 | Meister | B23D 59/02 | 125/13.01 |
| 5,662,017 A * | 9/1997 | Mellon | B23D 49/007 | 83/169 |
| 5,857,507 A * | 1/1999 | Puzio | B23D 47/025 | 144/286.1 |
| 5,918,522 A * | 7/1999 | Benedict | B27G 19/02 | 83/397 |
| 6,009,782 A * | 1/2000 | Tajima | B23D 59/006 | 83/471.3 |
| 6,139,411 A * | 10/2000 | Everts | B24B 23/005 | 451/359 |
| 6,318,351 B1 * | 11/2001 | Baratta | B23D 59/006 | 125/12 |
| 6,340,022 B1 * | 1/2002 | Schroer | B27B 5/32 | 125/12 |
| 6,470,778 B1 * | 10/2002 | Kaye, Jr. | B23D 59/006 | 144/252.1 |
| 6,557,261 B1 * | 5/2003 | Buser | B23D 59/006 | 30/124 |
| 6,865,974 B2 * | 3/2005 | Chang | B23D 59/006 | 83/169 |
| 7,165,922 B2 * | 1/2007 | Inuzuka | B23C 5/26 | 407/30 |
| 8,096,220 B2 * | 1/2012 | Weir | B27G 19/02 | 83/477.2 |
| 8,215,215 B2 * | 7/2012 | Chuang | B27G 19/02 | 83/102.1 |
| 2002/0189417 A1 * | 12/2002 | Liao | B26D 7/015 | 83/418 |
| 2004/0206220 A1 * | 10/2004 | Keenan | B23D 59/006 | 83/100 |
| 2004/0237743 A1 * | 12/2004 | Liao | B23D 45/068 | 83/477.2 |
| 2005/0071947 A1 * | 4/2005 | Yarbrough | A47L 9/181 | 15/353 |
| 2006/0042439 A1 * | 3/2006 | Powell | B23D 45/025 | 83/100 |
| 2006/0053629 A1 * | 3/2006 | Martin | B23D 59/006 | 30/123 |
| 2006/0185484 A1 * | 8/2006 | Sasaki | B23D 59/006 | 83/100 |
| 2006/0272464 A1 * | 12/2006 | Chen | B23D 45/065 | 83/100 |
| 2007/0017191 A1 * | 1/2007 | Miller | B23D 59/006 | 55/385.1 |
| 2008/0011138 A1 * | 1/2008 | Brazell | B23D 59/006 | 83/100 |
| 2008/0110527 A1 * | 5/2008 | Kuo | B27B 9/00 | 144/252.1 |
| 2009/0183377 A1 * | 7/2009 | Loveless | B23D 59/006 | 30/390 |
| 2009/0223070 A1 * | 9/2009 | Yang | B23D 59/006 | 30/391 |
| 2010/0269654 A1 * | 10/2010 | Needel | B23D 59/006 | 83/100 |
| 2010/0307308 A1 * | 12/2010 | Butler | B23D 59/006 | 83/100 |
| 2010/0325903 A1 * | 12/2010 | Patel | B23D 45/122 | 30/377 |
| 2011/0048205 A1 * | 3/2011 | Chung | B23D 45/067 | 83/477.2 |
| 2011/0061506 A1 * | 3/2011 | Frolov | B27G 19/02 | 83/102.1 |
| 2011/0162501 A1 * | 7/2011 | Koegel | B23D 59/006 | 83/100 |
| 2012/0036972 A1 * | 2/2012 | Frolov | B23D 59/006 | 83/168 |
| 2012/0073077 A1 * | 3/2012 | Ishikawa | A47L 9/2842 | 15/347 |
| 2012/0090439 A1 * | 4/2012 | Butler | B23D 59/006 | 83/68 |
| 2012/0090440 A1 * | 4/2012 | Koegel | B23D 59/006 | 83/100 |
| 2012/0216665 A1 * | 8/2012 | Gass | B27B 5/29 | 83/440.2 |
| 2013/0055577 A1 * | 3/2013 | Jensen | B23D 59/006 | 30/516 |
| 2013/0104714 A1 * | 5/2013 | Dammertz | B23D 45/06 | 83/98 |
| 2013/0160623 A1 * | 6/2013 | Taylor | B23D 59/006 | 83/147 |
| 2016/0318109 A1 * | 11/2016 | Koegel | B23D 59/006 | |
| 2017/0197285 A1 * | 7/2017 | Dragan | B23Q 11/0046 | |

\* cited by examiner

DUSTLESS TABLE SAW

FIELD OF THE INVENTION

The present disclosure generally relates to an apparatus for wood cutting, more specifically, to a table saw with a built-in dust extractor.

BACKGROUND OF THE INVENTION

Table saw is widely used in timber-processing industry for cutting various materials, such as wood, MDF (medium density fiberboard), HDF (high density fiberboard) or other material and composite board. Using a table saw to cut wood material usually produces a large amount of sawdust. At a typical work site, debris is usually scattered over a wide area; fine dust is also released into the air. Not only does it pollute the environment, inhalation of the fine dust may also harm the health of the workers.

There are some table saws on the market equipped with a built in dust extractor, however, these table saws do not extract dust very well, and still leave lots of dust behind. Some of these table saws do not have the capability of raising, lowering, or tilting the blade, thus render these table saws undesirable. Further, on these existing table saws, the blade is mounted to the snap ring of the rotatable arbor by two locking clamps; there is no reference point for adjusting the blade during installation and/or when the saw is in use. The instability of the blade will produce more sawdust, as a result reduces the effectiveness of the dust extraction.

Therefore, it is desirable to have a more efficient dust extracting table saw with capability of raising, lowering and tilting the blade, and stability of the blade.

SUMMARY OF THE INVENTION

A new dustless table saw for cutting wood or other material is disclosed herein.

In accordance with one embodiment, the dustless table saw comprises a blade housing having an arc shaped dust extraction channel, a foldable soft seal connecting the table housing and the blade slot on the table, a dust extraction tube, an extraction turbine, a dust extraction outlet to collect the saw dust, and an anti-dust blade guard. The dust extraction channel inside the blade housing has an opening on its top to allow the blade to extend into the dust extraction channel.

In accordance with another embodiment, the dustless table saw comprises a U-shaped blade housing with a divider, a dust extraction tube, an extraction turbine, a dust extraction outlet to collect the saw dust, and an anti-dust blade guard. The gap between the blade housing and table should be minimal.

In accordance with yet another embodiment, the table saw uses one motor to drive the blade and the extraction turbine. In one embodiment, the blade and the turbine are connected using a belt. In another embodiment, the blade and the turbine are connected using a gear box.

In accordance with yet another embodiment, the table saw uses one motor to drive the blade and another motor to drive the extraction turbine.

In accordance with yet another embodiment, the table saw uses a pair of bulges and corresponding locking clamps to increase the stability of the blade during operation.

In accordance with another embodiment, the table saw is equipped with built-in raising/lowering and tilting mechanism to raise/lower and tilt the blade housing and the blade.

BRIEF DESCRIPTION OF THE DRAWINGS

The drawings described herein are for illustrating purposes only of selected embodiments and not all possible implementations, and are not intended to limit the scope of the present disclosure. For further understanding of the nature and objects of this disclosure reference should be made to the following description, taken in conjunction with the accompanying drawings in which like parts are given like reference materials, and wherein.

DETAILED DESCRIPTION OF THE EMBODIMENTS

Before explaining the disclosed apparatus and method in detail, it is to be understood that the system and method is not limited to the particular embodiments and that it can be practiced or carried out in various ways.

Figure 1:
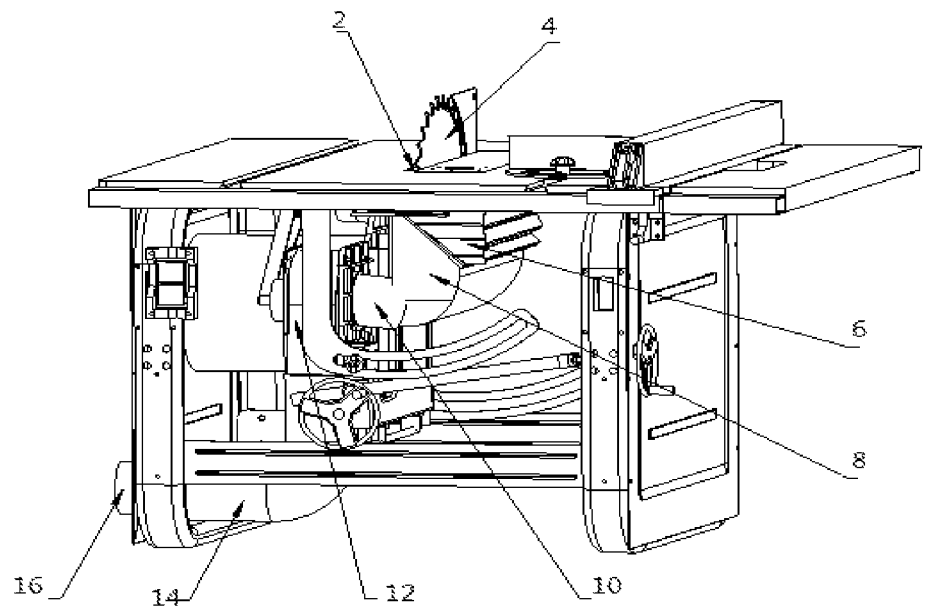
FIG. 1 is a side view of the table saw with a built-in dust extractor according to one embodiment.
Figure 2:
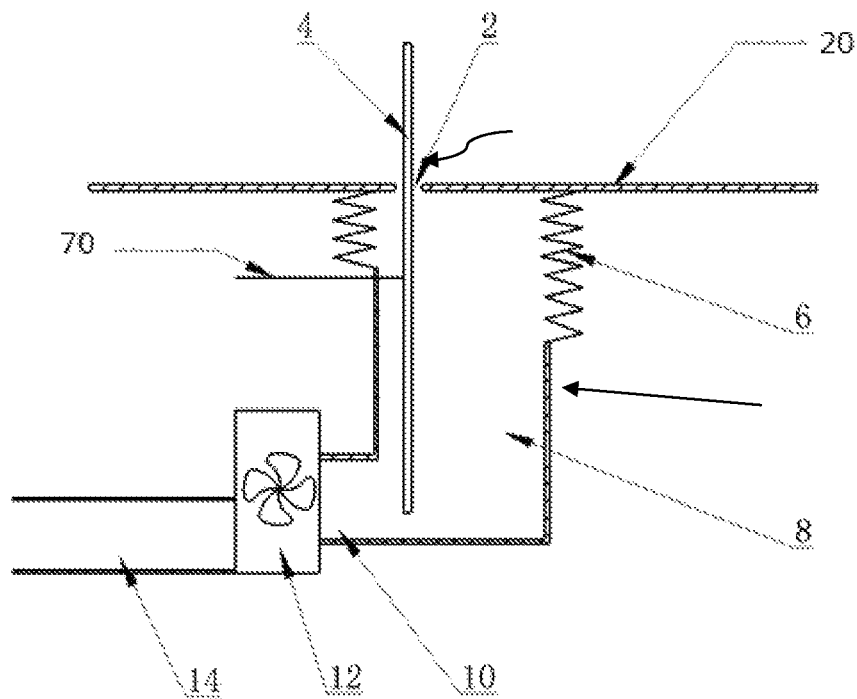
FIG. 2 is a sketch illustration of the table saw in FIG. 1.

Referring now to FIG. 1 and FIG. 2, a table saw comprises a table 20 and a saw compartment base under the table. The table saw includes a blade slot 2 on the table surface. A circular blade 4 of the saw compartment extends up through the blade slot 2 to the table surface. The saw compartment includes a blade housing 8, a dust extraction tube 10, a dust exhaust tube 14, and an extraction turbine 12. In one embodiment, a foldable soft seal 6 connects the blade housing 8 and the blade slot 2. A piece of wood, or other material to be cut, is placed on the table 20 and pushed to the blade 4 to make the cut. With the extracting turbine 12 running, the saw dust is extracted into the blade slot 2, through the foldable seal 6, into the blade housing 8, then to dust extraction tube 10, into the turbine chamber, and finally is blew into the dust exhaust tube 14 and out at the dust outlet 16. The dust is collected at the outlet 16 using a dust collection bag. Changing and cleaning the dust collection bag frequently helps increase the efficiency of the dust extraction.

Figure 4:
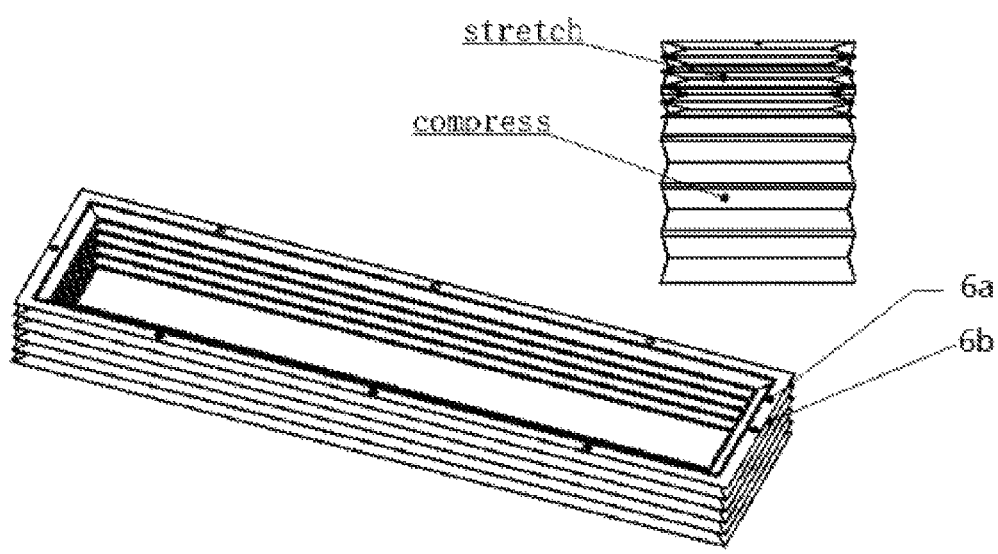
FIG. 4 illustrates one embodiment of the foldable seal cover of the table saw in FIG. 1.

The foldable seal 6 is made of airtight material. In accordance with one embodiment, the foldable seal 6 is shaped like an organ cover, as shown in FIG. 4. The foldable seal 6 includes a PVC frame 6a, and a waterproof, sunproof PVC coated fabric 6b. FIG. 4 also illustrates the foldable seal 6 in both stretched and compressed states. The foldable seal 6 may also be in other shapes, such as canvas like structure.

Referring back to FIG. 2, the foldable seal 6 seals the connection between the blade housing 8 and table 20 as shown in FIG. 2, making the blade slot 2 as the first air intake for the dust extraction apparatus of the saw compartment. The saw dust scatters around the blade slot 2 when the wood is cut. With the operating of the dust extraction apparatus, a pressure difference between the blade housing 8 and the blade slot 2 is maximized, hence optimally extracts the sawdust into the dust extraction apparatus. During the operating of the table saw, the wood or other material is pushed into the blade 4 on the table 20, thus gradually blocks the first air intake (the blade slot 2). In accordance with one embodiment, a second air intake 9 is provided in the blade housing 8 with appropriate size and shape, as shown in FIG. 2. When the first air intake (the blade slot 2) is blocked, the pressure difference at the second air intake 9 increases, adjusting the air intake to make sure the apparatus is working optimally.

Figures 3A, 3B:
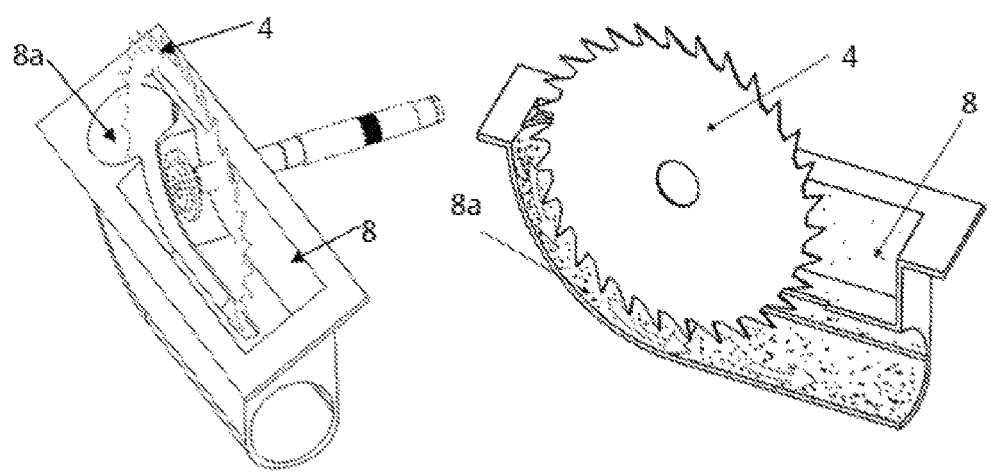
FIG. 3A and FIG. 3B are cross sectional views of the blade housing of the table saw in FIG. 1.

Referring now to FIGS. 3A and 3B, an arc shaped dust extraction channel 8a is illustrated from two different positions. The dust extraction channel 8a is a part of the blade housing 8. In accordance with one embodiment, the dust extraction channel 8a is a curved channel—with an opening at the top for the blade 4. The dust extraction channel 8a covers part of the blade teeth. The dust extraction channel 8a has a gap at the top for the blade 4. The width of the gap is a little bit larger than the width of the blade 4. The end of the dust extraction channel 8a connects to the dust extraction tube 10 which connects to the extraction turbine 12. When the blade is in operating condition, the sawdust is produced at the saw teeth edge. With the extraction turbine 12 running, the disclosed structure allows the sawdust go through the dust extraction channel 8a and the dust extraction tube 10 into the dust exhaust tube 14 and collected at the outlet 16. The disclosed structure maximizes the dust extraction. In a test conducted using the disclosed structure, the dust extraction rate is 98%. The disclosed structure also optimizes the overall structure of the apparatus and cuts the cost.

Figure 5:
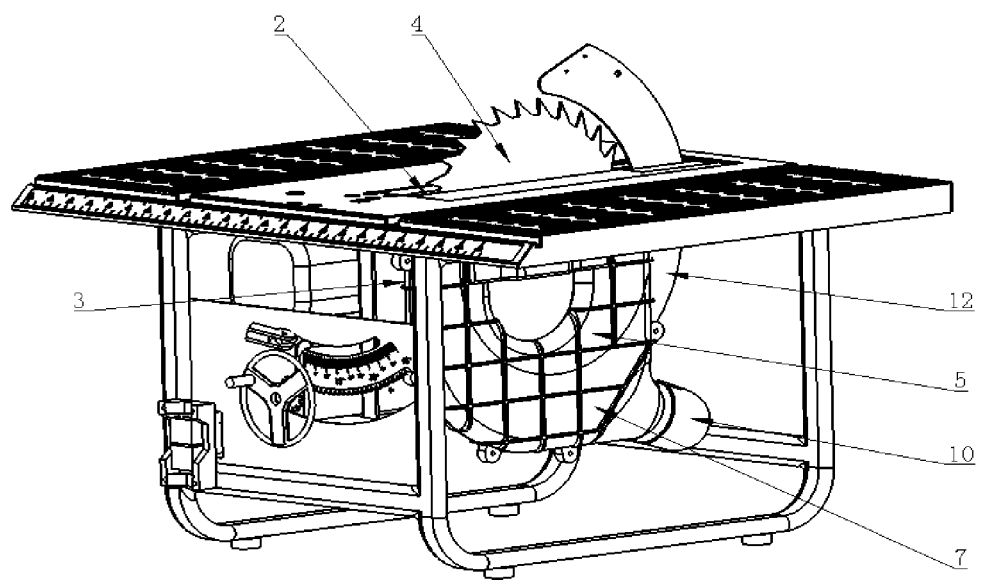
FIG. 5 illustrates another embodiment of a the table saw with a built-in dust extractor.
Figure 6:
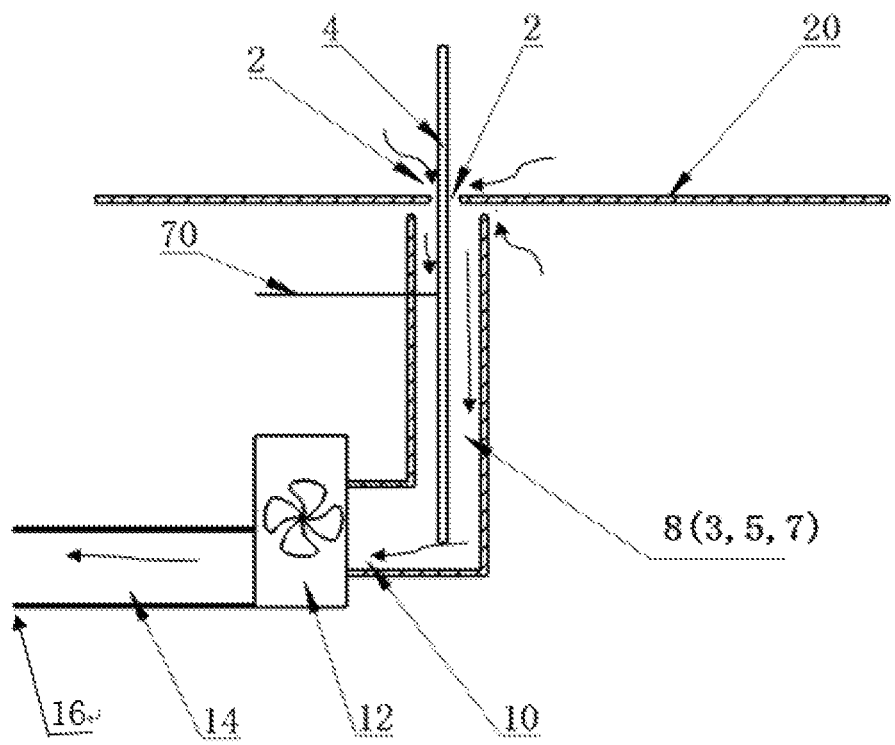
FIG. 6 is a sketch illustration of the table saw in FIG. 5.

Referring now to FIG. 5 and FIG. 6, another embodiment of the table saw is illustrated. Similar to the table saw illustrated in FIGS. 1 and 2, this embodiment also comprises a blade slot 2 on the table surface, a circular blade 4 extends up through the blade slot 2 to the table surface, a blade housing 8 under the table 20 to enclose the blade 4, a dust extraction tube 10, a dust exhaust tube 14, and an extraction turbine 12. With the extracting turbine 12 running, the saw dust is extracted into the blade slot 2, into the blade housing 8, then to dust extraction tube 10, into the turbine chamber, and finally is blew into the dust exhaust tube 14 and out at the dust outlet 16. The dust is collected at the outlet 16 using a dust collection bag. This embodiment of the table saw does not use the soft foldable seal. The blade housing 8 is fixed vertically. The gap between the bottom of the table 20 and the top of the blade housing 8 should be minimal to ensure minimum escape of the saw dust from this gap. When the first air intake (the blade slot 2) is blocked, the gap becomes the second air intake for the blade housing.

Figure 7:
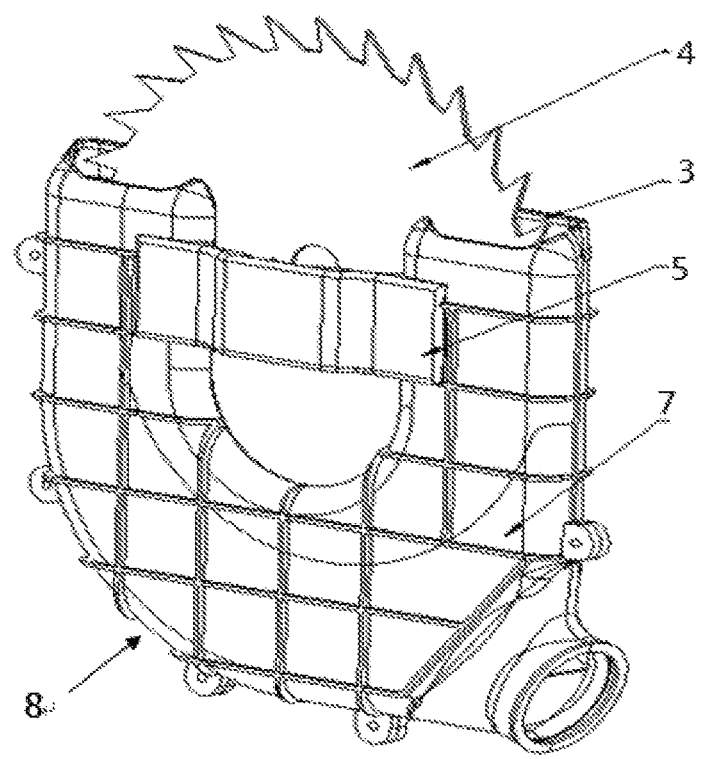
FIG. 7 illustrates one embodiment of a blade housing of the table saw in FIG. 5.

As illustrated in FIG. 7, the blade housing 8 comprises a front cover 7 and a back cover 3. The front cover 7 and the back cover 3 are fixed together using a set of screws. In one embodiment, the front cover 7 and the back cover 3 are U-shaped structures. A horizontal bar 5 is latched onto the two arms of the front cover 7 with appropriate latching mechanism to provide additional stability of the blade housing. The horizontal bar 5 may be removed by hand for installation and changing of the blade 4. As long as the blade 4 does not come in contact with the blade housing 8, the gap between the blade housing 8 and the blade body should be minimal.

Figures 8A, 8B:
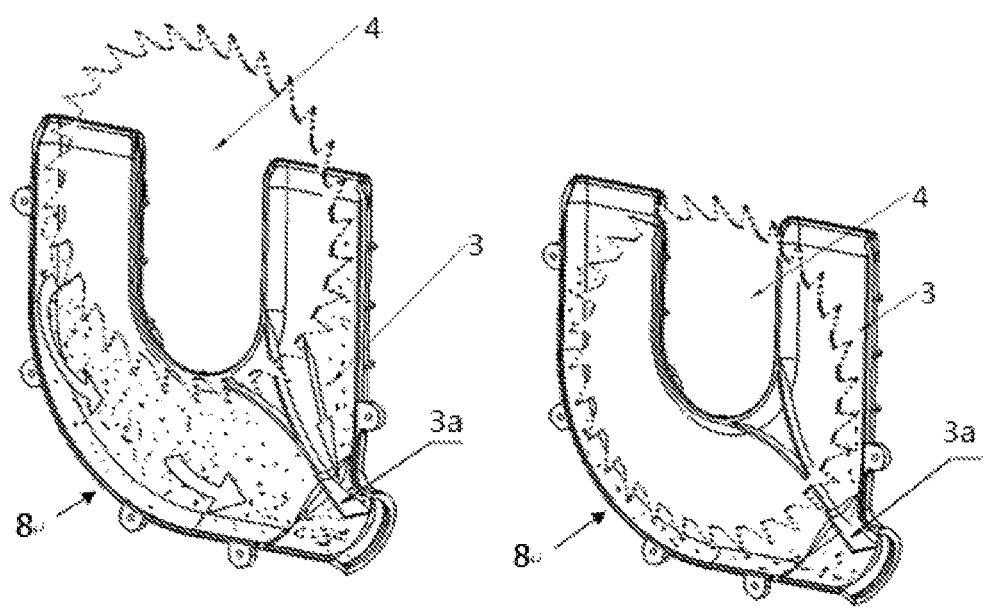
FIG. 8A and FIG. 8B are cross sectional views of the blade housing of the table saw in FIG. 5.

FIGS. 8A and 8B illustrate the blade housing 8 with the blade 4 in different positions. As shown in FIGS. 8A and 8B, the saw teeth under the table 20 are always enclosed in the blade housing 8. Inside the blade housing 8, a divider 3a is located between the upper arm of the blade housing 8 and the dust extraction tube 10. The divider 3a divides the blade housing 8 into two separate spaces at the junction of the blade housing and the dust extraction tube 10 to divert the air flow generated by the extracting turbine 12. As a result, the junction from the blade housing 8 to the dust extraction tube 10 is divided to two areas. The ration of these two areas is set to a value that maximizes the extraction.

Some of existing table saws on the market have some capability of tilting the blade but lack of functionality of raising, lowering the blade; others use a single handwheel to raise, lower, and tilt the blade, the resulting blade position may not be that accurate. The instant paper discloses a mechanism using two handwheels for adjusting the blade position: a front handwheel for raising/lowering the blade, and a side handwheel for tilting the blade.

Figure 9:
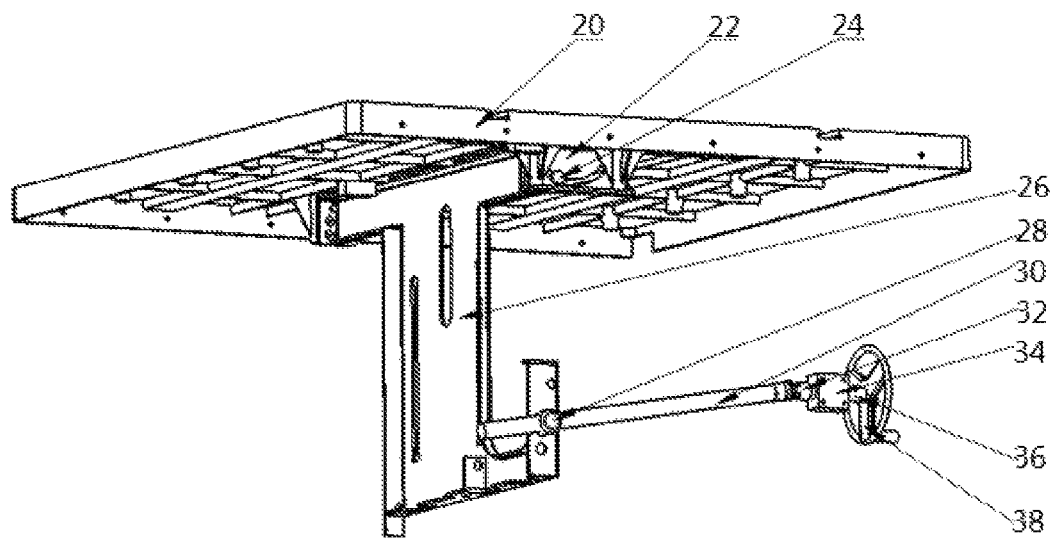
FIG. 9 illustrates one embodiment of tilting structure.
Figure 10:
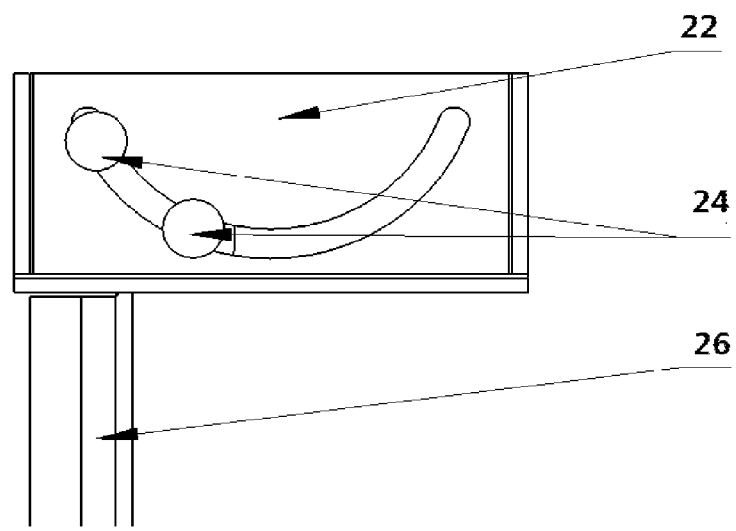
FIG. 10 is a sketch illustrating the tilting mechanism in FIG. 9.

FIGS. 9-10 illustrate a mechanism for tilting the blade 4 in accordance with one embodiment. The tilting mechanism includes a vertical plate 22, a tilting axis 24, a tilting plate 26, a tilting screw rod base 28, a tilting screw rod 30, and a tilting handwheel 38. The vertical plate 22 is vertically mounted to the bottom of the table 20 through positioning holes. The vertical plate 22 has a semicircle shaped opening. The tilting plate 26 is pivoted on the vertical plate 22 through the tilting axis 24 in the semicircle shaped opening. The tilting screw rod base 28 is attached to the tilting plate 26. The handwheel 38 is connected to a base 34 mounted to the table saw frame through a connecting rod 36. The tilting screw rod 30 pivots to the tilting screw rod base 28, and connects to the tilting handwheel 38 via the connecting rod 36 via a gimbal joint 32. Turn the tilting handwheel 38, the connecting rod 36 starts to tilt, then the gimbal joint 32 tilts, and the tilting screw rod 30 tilts, the tiling screw rod base 28 turns slightly, as a result the tilting plate 26 tilts around the center of the semicircle opening on the vertical plate 22, therefore tilts the blade 4.

Figure 11:
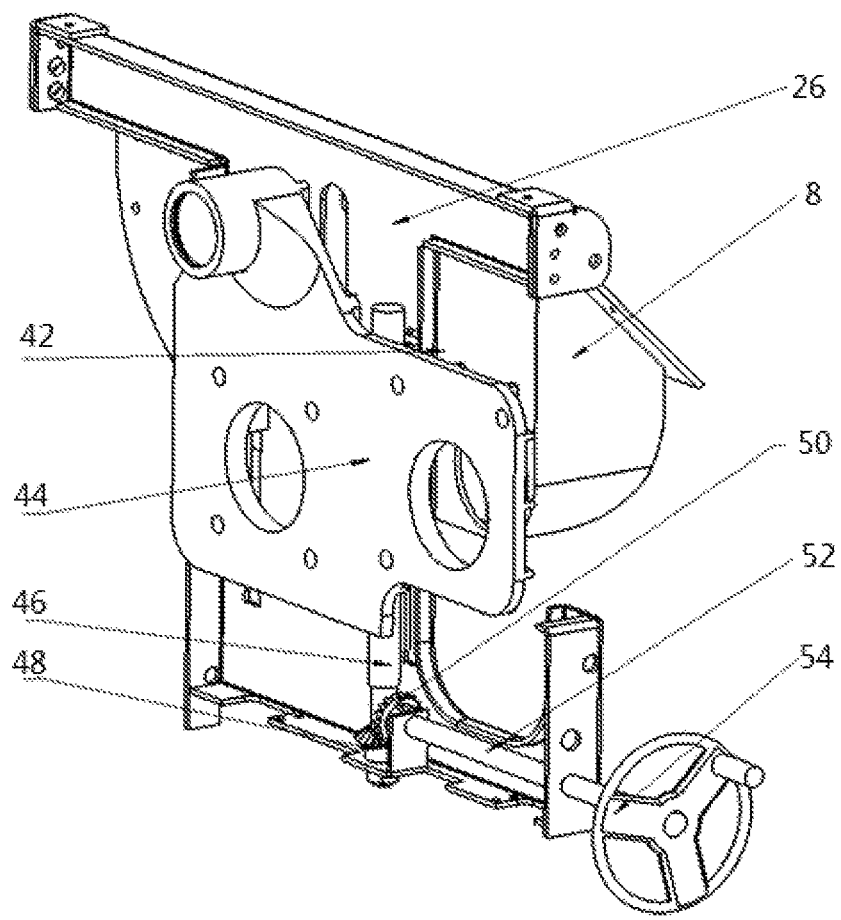
FIG. 11 and FIG. 12 are side views of the raising/lowering structure according to one embodiment.
Figure 12:
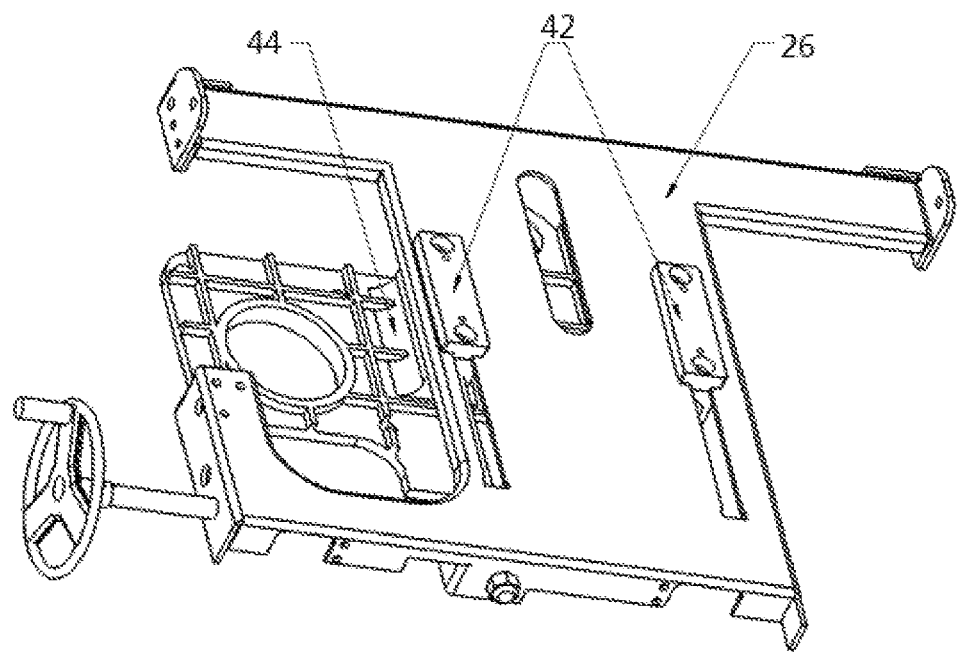

FIGS. 11-12 illustrate a mechanism for raising and lowering the blade in accordance with one embodiment. The raising/lowering mechanism includes a positioning slider 42, a lifting screw rod 46, a lifting rod 52, and a lifting handwheel 54. The positioning slider 42 connects to the motor base 44 at one side, and mounts to the blade housing 8 at the other side. The motor base 44 may slide freely along the sliding rail (not shown) on the tilting plate 26. The motor base 44 has a set of holes with threads suitable for connecting with the lifting screw rod 46. One end of the lifting screw rod 46 connects with a driven gear 48, and bends into the flange hole on the tilting plate 26. A driving gear 50 is coupled with the driven gear 48. The driving gear 50 connects with the lifting rod 52, and the lifting rod 52 connects to the lifting handwheel 54. Turn the lifting hand wheel 54, the lifting rod 52 tilts, causing the driving gear 50 and the coupled driven gear 48 in motion, and in turn causing the lifting screw rod 46 to tilt, the motor base 44 slides along the sliding rail on the tilting plate 26, and the blade housing 8 slides along with the motor base 44.

FIGS. 13-16 illustrate embodiments using a single motor for both blade and the dust extraction.

Figure 13:
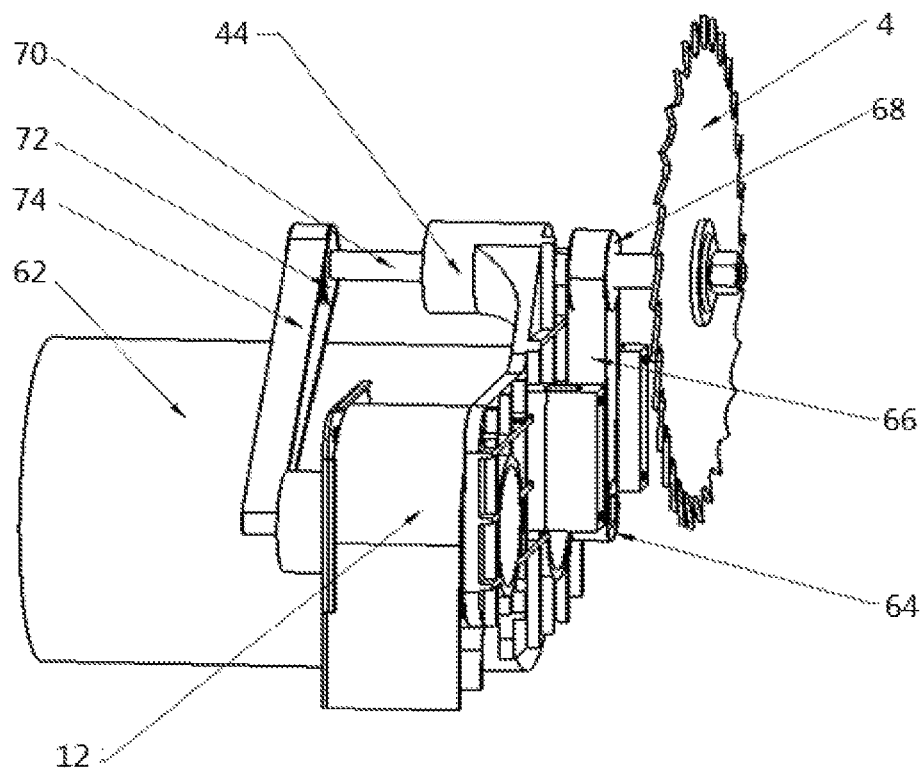
FIG. 13 and FIG. 14 illustrate one embodiment of a table saw with a single motor to drive both the blade and the dust extraction turbine using a belt.
Figure 14:
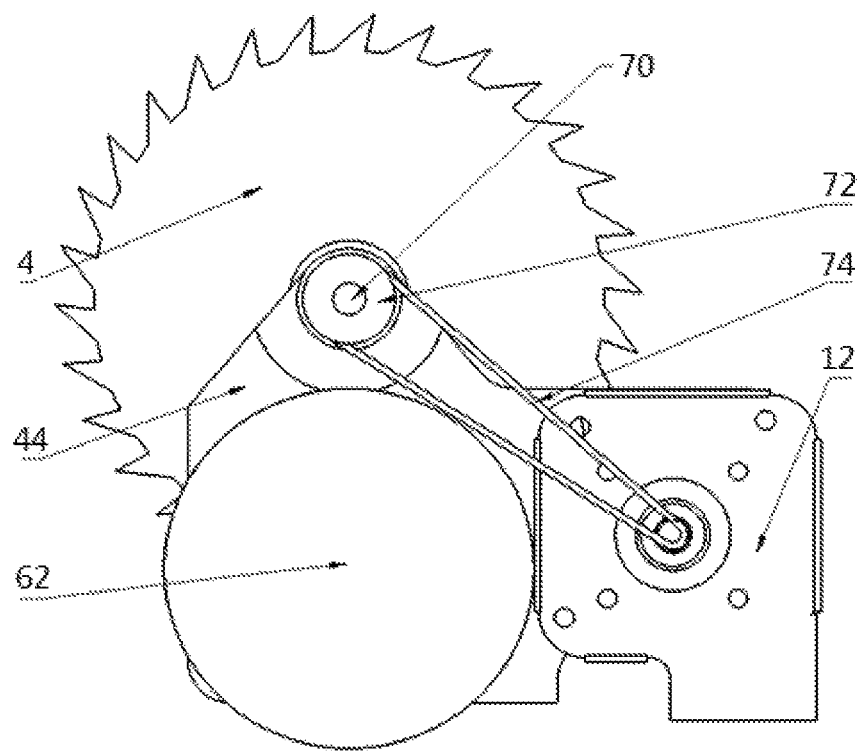

Referring now to FIGS. 13-14, as shown, a motor 62, the blade arbor 70, and the extraction turbine 12 are all mounted to the motor base 44. The motor 62 has a motor pulley 64. The motor pulley 64 connects with a blade pulley 68 on the blade arbor 70 via a blade belt 66. The blade arbor 70 is mounted to the motor base 44 via bearings. One end of the blade arbor 70 connects to the blade 4. The other end of the blade arbor 70 connects to an extraction driving wheel 72, which connects to the extraction turbine 12 through an extraction belt 74. In another embodiment, the motor directly drives the blade 4, the motor also connects to the extraction turbine 12 through a belt.

Figure 15:
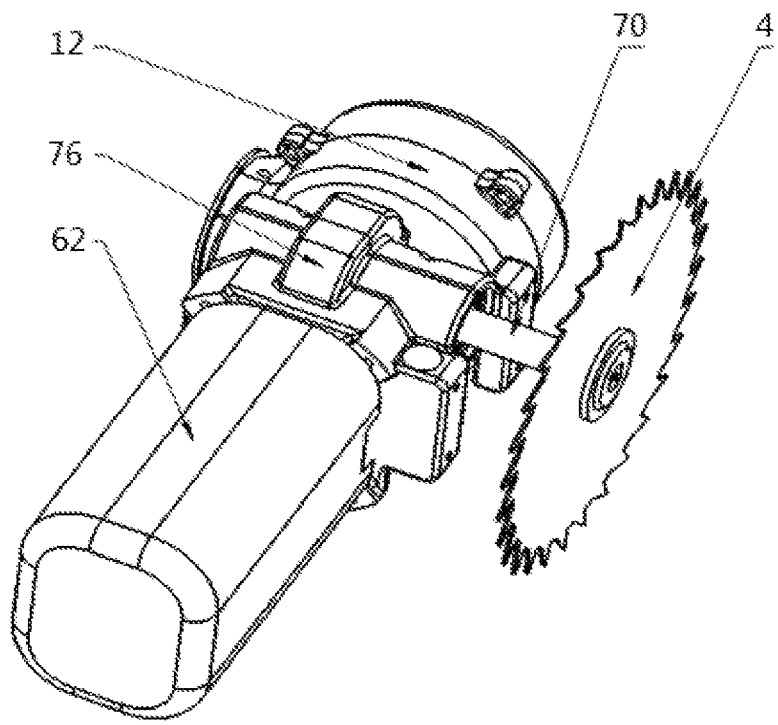
FIG. 15 and FIG. 16 illustrate one embodiment of a table saw with a single motor to drive both the blade and the dust extraction turbine using a gear box.
Figure 16:
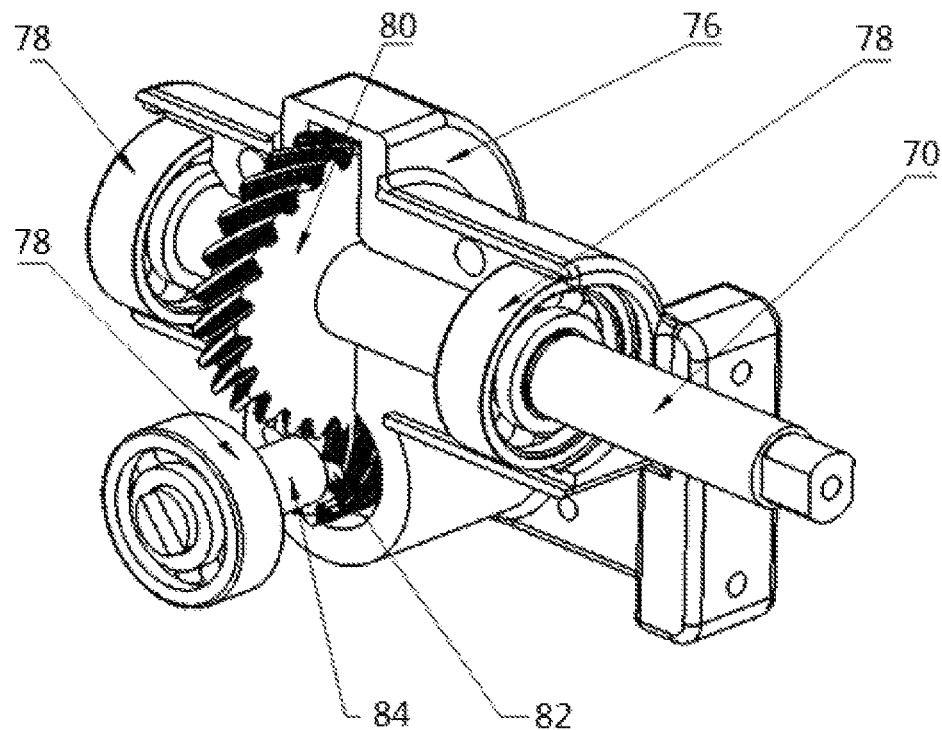

FIGS. 15-16 illustrate one embodiment using a gear box 76 to connect the blade 4 and the extraction turbine 12. The motor 62 connects a driving shaft 84, which mounts to the gear box 76 via bearing 78. The middle section of the driving shaft 84 connects with a small helical gear 82. One end of the blade arbor 70 is mounted to the gear box 76 via bearings 78. The middle section of the blade arbor 70 connects to a large helical gear 80. The small helical gear 82 and the large helical gear 80 are coupled to form a set of helical gears. The other end of the driving shaft 84 connects to the extraction turbine 12. The other end of the blade arbor 70 connects to the blade 4.

Figure 17:
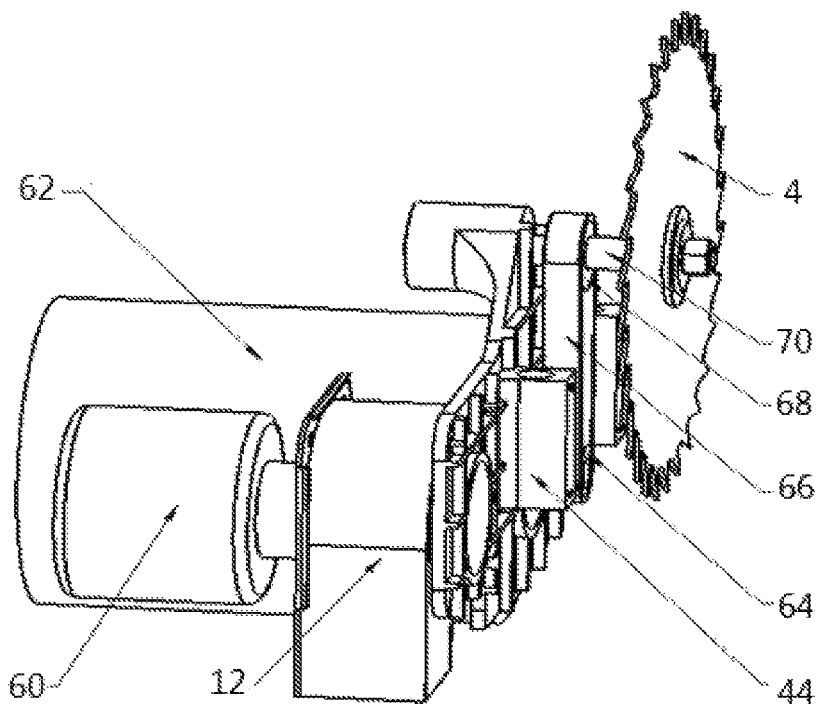
FIG. 17 illustrates one embodiment of a table saw with one motor to drive the blade and another motor to drive the extraction turbine.

FIG. 17 illustrates an embodiment using the motor 62 to drive the blade 4, and an extraction motor 60 to drive the extraction turbine 12. As shown, the motor 62 mounted on the motor base 44 has a motor pulley 64. The motor pulley 64 connects with the blade pulley 68 on the blade arbor 70 via the blade belt 66. The blade arbor 70 is mounted to the motor base 44 via bearings. One end of the blade arbor 70 connects to the blade 4. The extraction motor 60 is also mounted on the motor base 44. The extraction motor 60 connects to the extraction turbine 12 to drive the extraction turbine 12.

Figure 18:
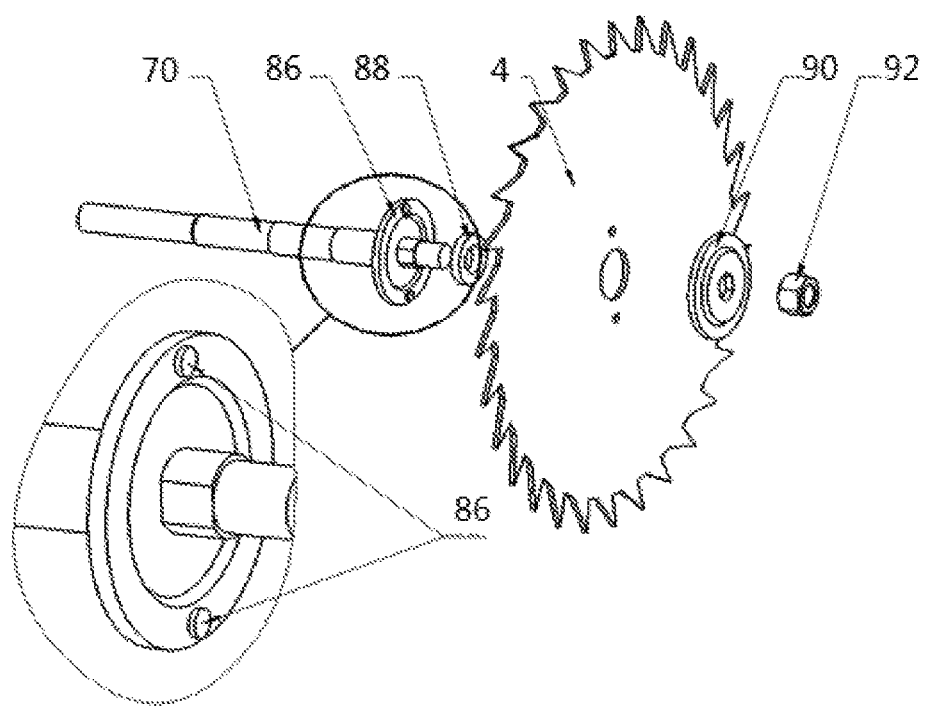
FIG. 18 illustrates an exploded view of the blade arbor and the blade according to one embodiment.
Figure 19:
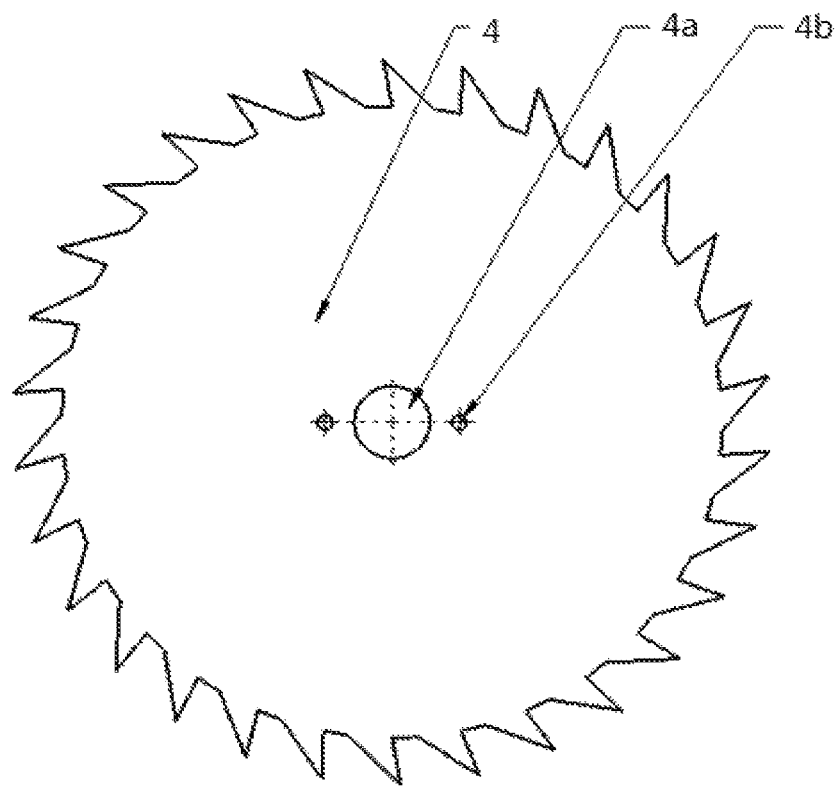
FIG. 19 illustrates one embodiment of the blade with a pair of positioning holes.

Referring now to FIGS. 18-19, the blade 4 has a pair of positioning holes 4b in accordance with one embodiment. The vibration of the blade along its axis direction increases the width of the kerf, as a result increases the saw dust. In one embodiment, a pair of bulges and corresponding locking clamps are used to increase the stability of the blade during operation. As shown in FIGS. 18-19, the blade 4 has a pair of positioning holes 4b. During the installation of the blade 4, inset the bulges 86 into the positioning holes 4b, clamp the corresponding locking clamps 90 onto the bulges 86, then use a locking screw 92 to tighten the blade 4. The bulges 86 and the matching locking clamps 90 may be in various shapes. The positioning holes may also in various shapes.

Figure 20:
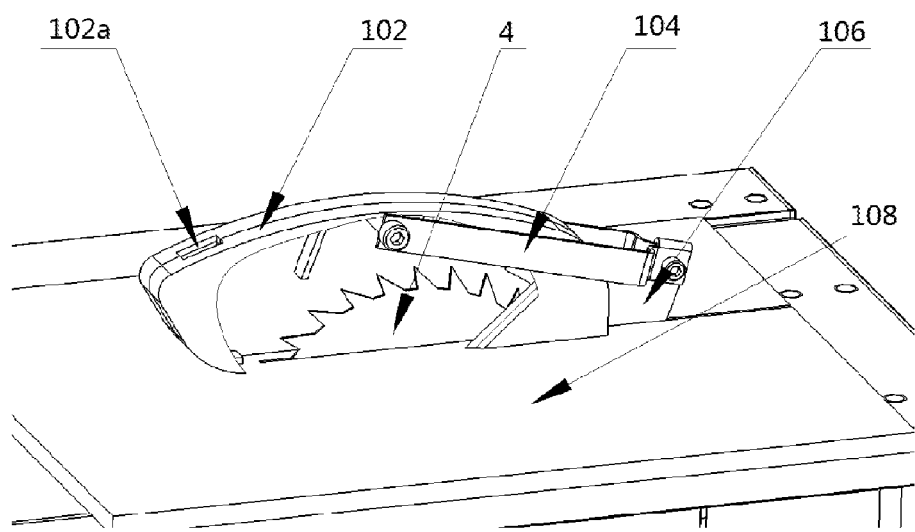
FIG. 20 illustrates one embodiment of anti-dust blade guard.
Figure 21:
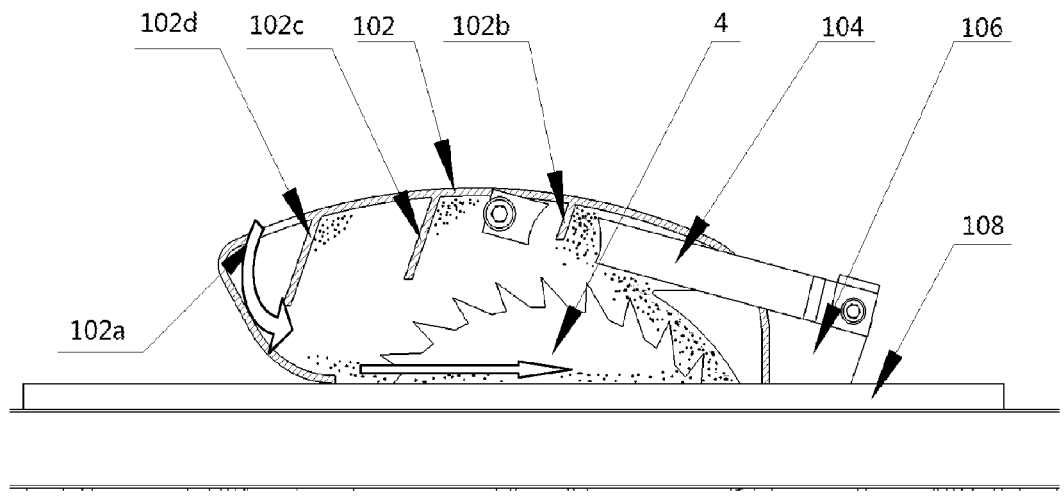
FIG. 21 is a cross sectional view of the anti-dust blade guard in FIG. 20.

Referring now to FIG. 20 and FIG. 21, one embodiment of an anti-dust blade guard is illustrated. An anti-dust blade guard 102 connects to the table 20 through a connector 104 and a splitter 106. The anti-dust guard 102 comprises an air intake 102a, a first barrier 102b, a second barrier 102c, and a third barrier 102d. The anti-dust blade guard 102 may automatically adjust its height according to the depth of the wood 108 and make the bottom of the blade guard fit the wood exactly to create a sealed room. The blade guard air intake 102a is located at the top front of the blade guard 102. When the blade 4 cuts the wood board 108, the anti-dust blade guard 102 can prevent the saw dust from scattering into the working environment. During the wood cutting operation, the saw debris and dusts are produced and scattered into the direction of the spinning. The first barrier 102b can cut off some of the saw debris and saw dusts. These saw debris and saw dusts may be cut by the blade for the second time and continue scattering into the direction of the spinning. The second barrier 102c may cut off some of these saw debris and saw dusts. The third barrier 102d diverts the air flow and cut off the remaining saw dusts. The air flow diverted by the third barrier 102d and the air flow generated by the spinning blade 4 work together to make the saw dusts remain in the blade guard 102 and let the saw dust go into the blade housing 8 through the kerf of the wood board.

Figure 22:
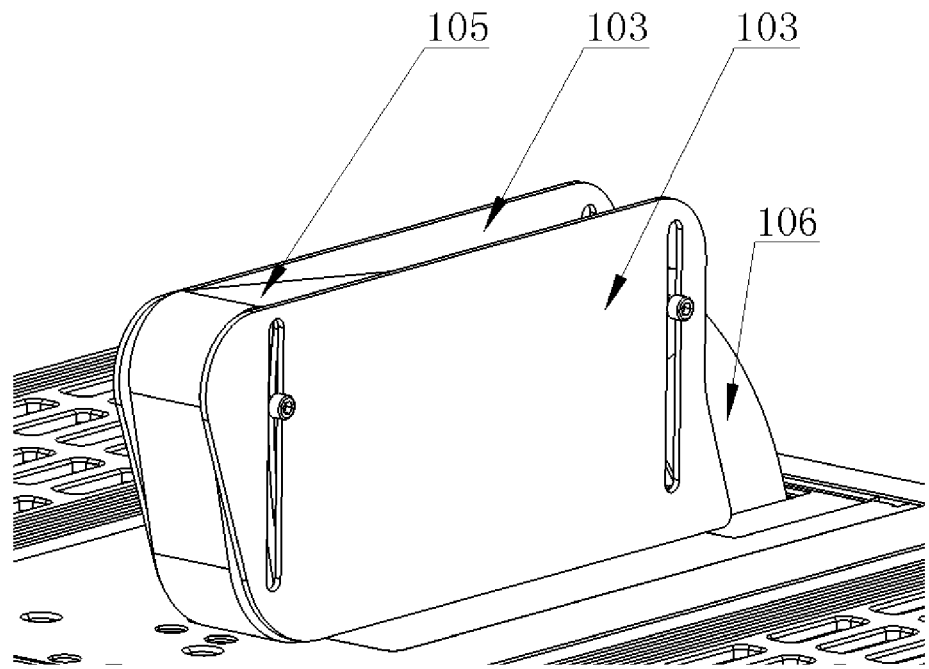
FIG. 22 illustrates another embodiment of anti-dust blade guard.
Figure 23:
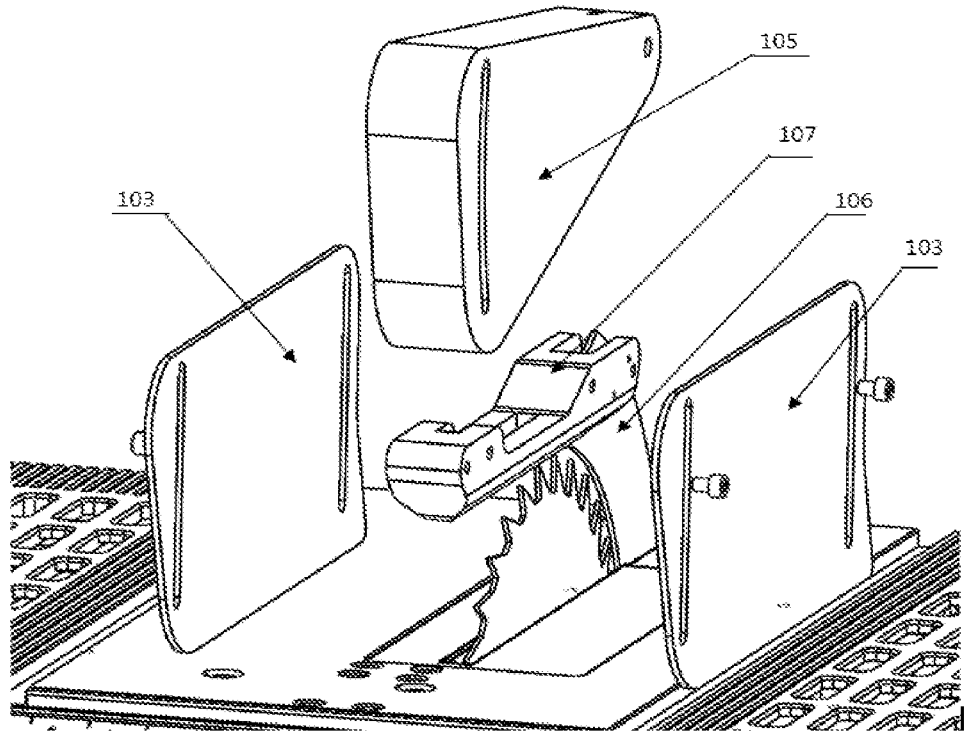
FIG. 23 is an exploded view of the anti-dust blade guard in FIG. 22.

Referring to FIG. 22 and FIG. 23, another embodiment of an anti-dust blade guard is illustrated. As shown, the anti-dust blade guard comprises a pair of blade guard side barriers 103, a blade guard strut 107, and a hollow blade guard cover 105. One end of the blade guard strut 107 is fixed to a splitter 106. A pair of screw holes is located at each end of the blade guard strut 107. There is a circular hole at each side of the blade guard cover 105 back end, and a groove at each side of the front end of the blade guard cover 105. Each side barrier 103 has a pair of oval grooves, one at each end. During installation, a screw goes through the back end groove of the side barrier 103, the circular hole at the back end of the hollow blade guard cover 105, and one of the screw holes at the back end of the blade guard strut 107. At the front end, a screw goes through the front end groove of the side barrier 103, the circular hole at the front end of the hollow blade guard cover 105, and one of the screw holes at the front end of the blade guard strut 107. This structure allows side barriers 103 to move freely. The blade guard may self-adjust according to the lifting and/or tilting of the blade in order to make the cutting area in a relatively sealed room and prevent the saw dust from scattering into the working environment.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

What is claimed is:

1. A portable table saw for cutting wood or other material, comprising:
   a table having an opening on its surface;
   a saw blade attached to a blade arbor, the blade extending through the opening on the table;
   a blade housing generally enclosing the saw blade, wherein the blade housing comprising a blade chamber defined by a first wall parallel to the blade on one side of the blade, a second wall parallel to the blade on an opposite side of the blade, and a third wall perpendicular to the blade connecting with the first and the second walls at bottom, and a semi-sealed dust extraction channel positioned under the blade chamber defined by the third wall and a tube, the third wall having an opening to allow the saw blade teeth to extend into the dust extraction channel;

a dust extraction tube coupled to the blade housing;

an extraction turbine connected to the dust extraction tube to provide extraction power;

a dust exhaust tube connected to the extraction turbine;

a dust collection bag at the end of the dust exhaust channel to collect the dust; and a self-adjusting blade guard located at the top of the table surface to cover the opening of the table.

2. The portable table saw according to claim 1, wherein the blade housing comprises a first air inlet.

3. The portable table saw according to claim 1 further comprising a foldable soft seal connecting the blade housing and the opening on the table.

4. The portable table saw according to claim 1, wherein the dust extraction channel in the blade housing is an arc shaped structure.

5. The portable table saw according to claim 1 further comprising a lifting/lowering mechanism.

6. The portable table saw according to claim 1 further comprising a tilting mechanism.

7. The portable table saw according to claim 1 further comprising a motor to drive both the saw blade and the extraction turbine.

8. The portable table saw according to claim 7, wherein the motor drives the saw blade through a belt.

9. The portable table saw according to claim 7, wherein the motor drives the extraction turbine through a belt.

10. The portable table saw according to claim 7, wherein the saw blade and the extraction turbine are connected through a set of gears.

11. The portable table saw according to claim 1 further comprising a first motor to drive the saw blade and a second motor to drive the extraction turbine.

12. The portable table saw according to claim 1, wherein the blade comprises a set of positioning holes, the blade arbor comprises a set of bulges and matching locking clamps.

13. The portable table saw according to claim 1, wherein the self-adjusting blade guard comprises a second air inlet and a plurality of dust barriers.

14. The portable table saw according to claim 1, wherein the self-adjusting blade guard comprises a pair of side barriers loosely attached to a top cover, the side barriers may move freely in the vertical direction.

15. A portable table saw for cutting wood or other material, comprising:

a table having an opening on the surface;

a saw blade attached to a blade arbor, the blade extending through the opening on the table;

a blade housing generally enclosing the saw blade, wherein the blade housing comprises a U-shaped front cover parallel to the blade secured to a U-shaped back cover parallel to the blade to form a blade chamber, and a divider dividing the blade chamber into two sections;

a dust extraction tube coupled to the blade housing;

an extraction turbine connected to the dust extraction tube to provide extraction power;

a dust exhaust tube connected to the extraction turbine;

a dust collection bag at the end of the dust exhaust channel to collect the dust; and a blade guard located at the top of the table surface to cover the opening of the table.

16. The portable table saw according to claim 15, wherein the blade housing further comprises a horizontal bar attached to two upper arms of the U-shaped front cover to provide additional stability.

17. The portable table saw according to claim 15 further comprising a lifting/lowering mechanism.

18. The portable table saw according to claim 15 further comprising a tilting mechanism.

19. The portable table saw according to claim 15 further comprising a motor to drive both the saw blade and the extraction turbine.

20. The portable table saw according to claim 19, wherein the motor drives the saw blade through a belt.

21. The portable table saw according to claim 19, wherein the motor drives the extraction turbine through a belt.

22. The portable table saw according to claim 19, wherein the saw blade and the extraction turbine are connected through a set of gears.

23. The portable table saw according to claim 15 further comprising a first motor to drive the saw blade and a second motor to drive the extraction turbine.

24. The portable table saw according to claim 15, wherein the blade comprises a set of positioning holes, the blade arbor comprises a set of bulges and matching locking clamps.

25. The portable table saw according to claim 15, wherein the self-adjusting blade guard comprises an air inlet and a plurality of dust barriers.

26. The portable table saw according to claim 15, wherein the self-adjusting blade guard comprises a pair of side barriers loosely attached to a top cover, the side barriers may move freely in the vertical direction.

* * * * *

UNITED STATES PATENT AND TRADEMARK OFFICE
CERTIFICATE OF CORRECTION

| | | |
|---|---|---|
| PATENT NO. | : 9,956,626 B2 | Page 1 of 1 |
| APPLICATION NO. | : 15/062089 | |
| DATED | : May 1, 2018 | |
| INVENTOR(S) | : Wang et al. | |

It is certified that error appears in the above-identified patent and that said Letters Patent is hereby corrected as shown below:

On the Title Page

Item (73), Please correct the assignee to:
Sirocco Dustless LLC

Signed and Sealed this
Tenth Day of May, 2022

Katherine Kelly Vidal
*Director of the United States Patent and Trademark Office*